UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

RED DYE.

SPECIFICATION forming part of Letters Patent No. 426,345, dated April 22, 1890.

Application filed October 8, 1889. Serial No. 326,346. (Specimens.)

*To all whom it may concern:*

Be it known that I, ARTHUR WEINBERG, doctor of philosophy, a citizen of the Empire of Germany, residing at Frankfort-on-the-Main, in said Empire, have invented new and useful Improvements in the Manufacture of a new Red Dye-Stuff, of which the following is a specification.

In the class of azo colors derived from benzidine and similar amines red dye-stuffs have only been obtained in combining such diamines with naphthylamine sulpho-acids. The shades of the thus produced colors are more or less changed by acids. It is further known that the corresponding combinations of the naphthol sulpho-acids which resist acids are of blue to violet shades. I have, however, found a method to produce a brilliant red benzidine dye-stuff belonging to the class of the naphthol derivatives which resists acids.

In order to carry out my invention, I combine benzidine with the so-called "beta-naphthol gamma disulpho-acid," (United States Patent No. 331,059.) This reaction takes place only between one equivalent of the tetrazo compound and one equivalent of the sulpho-acid. The product shows the properties of a diazo compound. I combine the same with an equivalent of phenol and heat the basic salt of the resulting dye-stuff with alkylogens or with alkyl sulphates, or with benzyl chloride.

Example: 18.4 kilos of benzidine are diazotized and the tetrazo compound is added to a cooled solution of forty kilos of beta-naphthol gamma disulphonate. After a short time ten kilos of phenol are introduced. I heat to the boiling-point, and the coloring-matter formed is precipitated by common salt and separated by filtration. The precipitate is again dissolved in two hundred liters of water, two hundred liters of alcohol, and 4.5 kilos of caustic soda, and heated together with six kilos of methyl chloride or twelve kilos of ethyl bromide, or 12.5 kilos of benzyl chloride during twenty-four hours in a closed vessel to about 60° centigrade. After cooling the new coloring-matter separates in shining red crystals.

The composition of this coloring-matter is represented by the following formula:

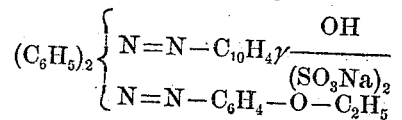

This coloring-matter is easily soluble in hot water, scarcely soluble in spirit, and dissolves with a violet color in strong sulphuric acid. Reducing agents destroy its color, forming benzidine, amidonaphthol-disulphonic acid and paramido-phenolether. It dyes a bright fiery red on unmordanted cotton in an alkaline, neutral, or acid bath—for instance, in presence of carbonate of potash, common salt, or bisulphate of soda—and it dyes wool and silk in an acidulated bath bright-scarlet shades.

What I claim as my invention is—

The new red dye-stuff hereinabove described, consisting of a crystalline red powder which is easily soluble in hot water, scarcely soluble in spirit, and dissolves with a violet color in strong sulphuric acid, and which by reducing agents has its color destroyed, forming benzidine, amidonaphthol-disulphonic acid and paramido-phenolether.

In testimony whereof I have signed my name to this specification in the presence of two subscribing witnesses.

ARTHUR WEINBERG.

Witnesses:
LUDWIG MASCHMANN,
ALVESTO P. HOGUE.